Nov. 20, 1923.
J. A. LEONARD
1,474,485
VALVE LIFTER
Filed June 28, 1922
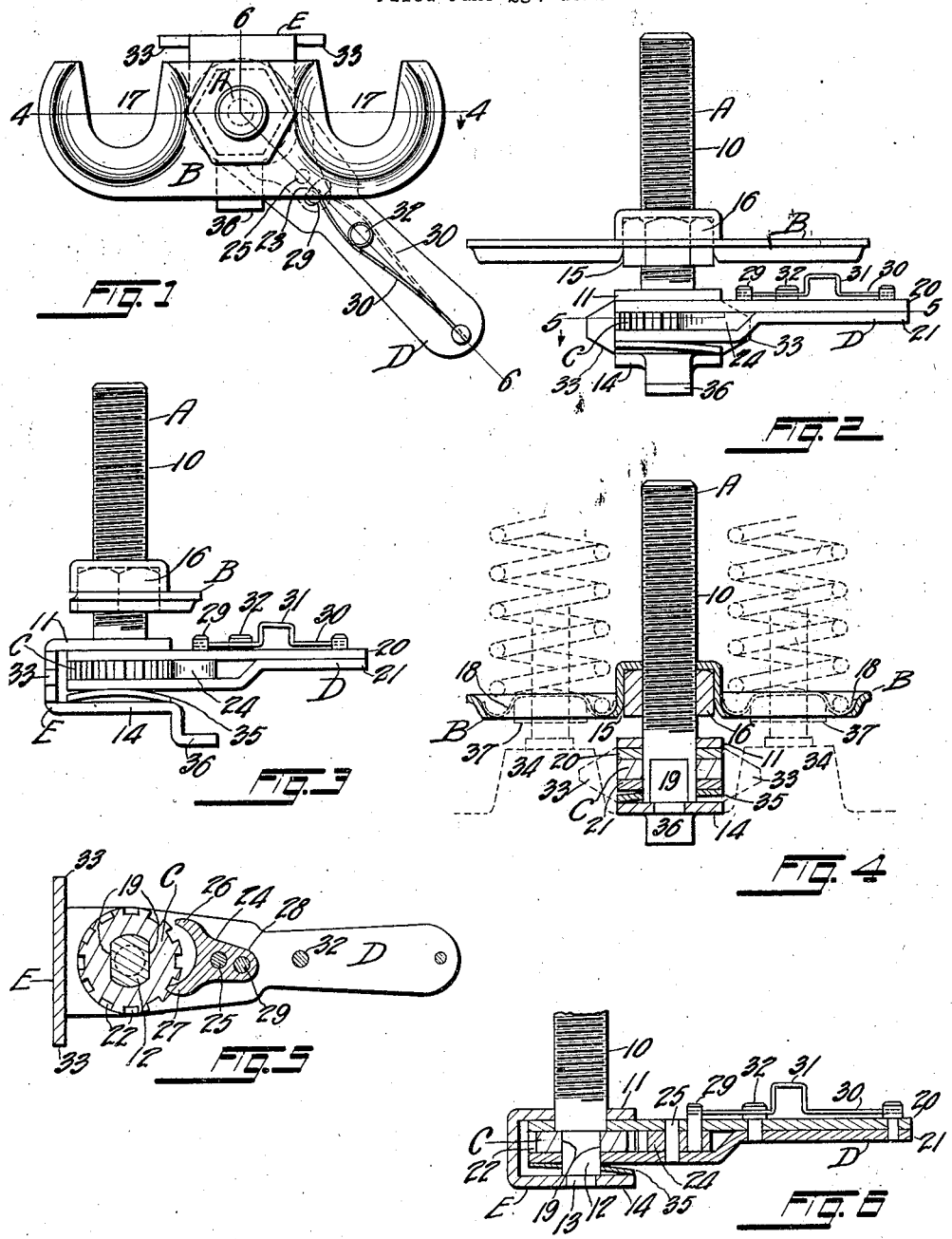
Inventor
J. A. Leonard.
By C. F. Heinkel.
Attorney.

Patented Nov. 20, 1923.

1,474,485

UNITED STATES PATENT OFFICE.

JACOB A. LEONARD, OF ROCKFORD, ILLINOIS.

VALVE LIFTER.

Application filed June 28, 1922. Serial No. 571,534.

*To all whom it may concern:*

Be it known that I, JACOB A. LEONARD, a citizen of the United States, and a resident of Rockford, county of Winnebago, and State of Illinois, have invented a new and useful Improvement in Valve Lifters, of which the following is a specification.

My invention relates to apparatus for compressing the springs of poppet valves for the purpose of removing the keys therefrom and permit the valves to be lifted out of the engine and to release the springs after the keys are again inserted.

The object of my invention is a simple and efficient valve lifter adapted to compress two springs at one operation and retain the same in such position and to release the same.

I attain this object by the mechanism shown in the accompanying drawings in which Fig. 1 is a plan view of an apparatus adapted to accomplish my object; Fig. 2 is a side view of Fig. 1; Fig. 3 is an end view of Fig. 1; Fig. 4 is a section on line 4—4 of Fig. 1; Fig. 5 is a section on line 5—5 of Fig. 2; and Fig. 6 is a section on line 6—6 of Fig. 1.

Similar reference characters refer to similar parts throughout the views.

For certain purposes, such as regrinding or inspection, the poppet valves of engines must be disconnected from their operating mechanism which, usually, consists of a key through the valve stem and abutting a washer on the end of a spring. In most engines it is quite inconvenient to remove this key and thus disconnect the valve without a suitable instrument.

The present invention aims to provide such an instrument so that an operator can compress the spring readily and can retain the spring in such compressed position without attention on his part so that he can devote all of his attention to the removal of the key and valve and to the insertion of the valve and key, and so that an operator can readily release this compression from the spring.

Referring now to the drawings. The apparatus shown is composed, principally, of the screw A, the plate B, the ratchet wheel C, the operating handle D, and the base E.

The screw A has the threaded portion 10 which is journaled in the upper member 11 of the base E, the flat sided portion 12 fitting into the ratchet wheel C, and the reduced portion 13 journaled in the lower member 14 of the base E.

The plate B has the central depression 15 fitting over the nut 16 and is, preferably, secured thereto either by press fit or welding or other means.

This plate B also has the two open ended slots 17 to permit that this plate can be slipped over the valve operating stems. A portion of the contour of these slots is curved to suit the contour of the washers 18 so that this plate does not extend below the bottom of these washers and so that these washers do not slip thereon easily and so that this plate as a whole is stiffened thereby.

The ratchet wheel C is held nonrotatably on the screw A by the flat sides 19, fits loosely between the members 20 and 21 of the handle D, and is provided with the notches 22 on its outer circumference.

The upper member 20 of the handle D is straight and has the arcuate slot 23. The lower member 21 is bent down at one end as shown to form a fork between the prongs of which the ratchet C fits as stated.

The members 20 and 21 may be riveted or welded or held together in any suitable manner.

The pawl 24 is pivoted on the pin 25 which is secured to the handle D and has the fingers 26 and 27 adapted to engage the notches 22 and also has the projection 28 which carries the pin 29 extending through the arcuate slot 23.

The outer end of the spring 30 is secured to the handle D while the inner end thereof is secured to the pin 29. The bent up portion 31 is provided as a handle to take hold of the spring for the purpose of lifting it over the stud 32 when shifting either of the fingers into or out of engagement with the ratchet wheel.

The stud 32 is secured to the handle D and forms an abutment for the spring 30 as will appear presently.

The base E, U shaped as shown, has the projections 33 which engage the rear face of the bosses 34 in which the valve operating mechanisms are mounted to prevent slippage of the apparatus.

The spring washer 35 is interposed between the members 14 and 21 to hold the screw A upward.

The operation of this particular apparatus is as follows:

The plate B is screwed down to near the base. The whole apparatus is then inserted into the side of the engine so that the valve tappets are located in the slots 17. The apparatus is then permitted to drop down and rest on the engine housing at which stage the member 14 rests on the housing, the projections 33 rest against the rear of the bosses 34, and the foot 36 rests on a ledge usually found on engine housings. This forms a substantial footing for the apparatus.

Then place the spring 30 on the left hand side of the stud 32 as shown in full lines in the drawings whereby the pin 29, and consequently the projection 28, is swivelled to the left on the pin 25 and the finger 27 is brought into engagement with the notches on the ratchet wheel. The spring 30, now having an abutment on the stud 32, also now acts on the pawl 24 to keep the finger 27 in engagement with the notches in the ratchet wheel.

Then move the handle D forward in the direction of the arrow which movement partially rotates the screw and moves the nut (prevented from rotation by the plate) upward since there is a right hand thread on the screw. A reverse movement of the handle engages a new notch and the next forward movement again partially rotates the screw as is well known in pawl and ratchet practice.

This upward movement of the nut and consequently the plate causes the curved edges of the slots 17 to first engage the washers 18 and then force the lower part of the spring upward until the washer is above the key 37 whereupon the latter can readily be removed and the valve is released and can be lifted.

When it is desired to put the valve into place, insert the key 37, then move the spring 30 to the right hand side of the stud 32 as shown in dotted lines in the drawings which causes the finger 26 to engage the notches on the ratchet wheel and rotate the screw in opposite direction when the handle is operated.

I am aware that modifications may be made within the scope of the appended claims; therefore, without limiting myself to the precise construction shown and described, I claim:—

1. A valve lifter comprising a U shaped base, a screw having the lower end thereof journaled in the legs of said U shaped base and the upper end thereof threaded, a ratchet mechanism between said legs to rotate said screw, a plate independent of said base and in threaded engagement with said threaded end of said screw and provided with valve spring engaging means.

2. A valve lifter comprising a base, a screw having the lower end thereof journaled in said base and the upper end thereof threaded, a plate independent of said base and provided with a valve spring engaging means on each end thereof and with means to engage said threaded end of said screw disposed between said spring engaging means, and means for operating said screw to move said plate toward or away from said base.

3. A valve lifter comprising a base, a screw journaled in said base, a ratchet wheel secured to said screw, an operating handle engaging said ratchet wheel, a spring between the lower members of said base and said handle, and a plate in threaded engagement with said screw and provided with means for engaging a valve spring.

4. A valve lifter comprising a base provided with projections to retain the same in position, a screw journaled in said base, a ratchet wheel secured to said screw, an operating handle journaled on said screw and provided with a pawl adapted to engage said ratchet wheel for either forward or backward rotation, a spring between the lower members of said base and said handle, and a plate in threaded engagement with said screw and provided with means for engaging a valve spring.

5. The combination of a valve lifter provided with a lifting screw and a ratchet wheel secured thereto, with an operating handle having one end forked over said ratchet wheel and journaled on said screw, a pawl pivotally mounted in said forked end and provided with two fingers on one side of said pivot and with a pin on the other side of said pivot, a spring having one end secured to said handle and the other end to said pin in the pawl, and an abutment stud secured to said handle intermediate the ends of said spring.

6. In a valve lifter, the combination of a screw, a plate, a nut secured to said plate and engaging said screw, said plate being provided with curved depressions adapted to engage two valve spring washers without projecting below the lower surface of these washers.

7. In a valve lifter, the combination of a screw and a plate in threaded engagement therewith, with a U shaped base having said screw journaled therein and provided with lugs adapted to engage portions of an engine to prevent slippage of said base.

JACOB A. LEONARD.